United States Patent [19]

Schwarzkopf et al.

[11] Patent Number: 4,790,493
[45] Date of Patent: Dec. 13, 1988

[54] DEVICE FOR MEASURING THE ROLL RATE OR ROLL ATTITUDE OF A MISSILE

[75] Inventors: Gerhart Schwarzkopf, Uhldingen-Mühlhofen; Bernd Dulat, Überlingen/Bodensee, both of Fed. Rep. of Germany

[73] Assignee: Bodenseewerk Geratetechnick GmbH, Fed. Rep. of Germany

[21] Appl. No.: 103,969

[22] Filed: Oct. 5, 1987

[30] Foreign Application Priority Data

Oct. 8, 1986 [DE] Fed. Rep. of Germany ....... 3634192

[51] Int. Cl.$^4$ .............................................. F41G 7/00
[52] U.S. Cl. .................................. 244/3.21; 244/3.15
[58] Field of Search ...................... 244/3.21, 3.15, 3.16

[56] References Cited

U.S. PATENT DOCUMENTS

| 3,216,674 | 11/1965 | McLean | 244/3.16 |
| 3,813,067 | 5/1974 | Mork | 244/3.15 |
| 4,168,813 | 9/1979 | Pinson et al. | 244/3.15 |
| 4,277,039 | 7/1981 | Blanning et al. | 244/3.16 |
| 4,445,376 | 5/1984 | Merhav | 73/510 |
| 4,522,062 | 6/1985 | Peters | 73/505 |
| 4,542,870 | 9/1985 | Howell | 244/3.15 |
| 4,659,035 | 4/1987 | Clendenning | 244/3.21 |

FOREIGN PATENT DOCUMENTS

| 1453890 | 1/1970 | Fed. Rep. of Germany . |
| 3137160A1 | 5/1982 | Fed. Rep. of Germany . |
| 3227205A1 | 2/1983 | Fed. Rep. of Germany . |
| 2811448C2 | 5/1983 | Fed. Rep. of Germany . |

Primary Examiner—Charles T. Jordan
Attorney, Agent, or Firm—Lee & Smith

[57] ABSTRACT

A rate gyro (10) is arranged in a seeker head of a missile and is stimulated to nutate with its natural nutation frequency in inertial space for the purpose of scanning a field of view. The rotational frequency and the nutation frequency of the rate gyro (10) relative to the missile are determined. The roll rate or roll angle is achieved by subtraction of these frequencies multiplied by suitable factors depending on the gyro in a roll measuring circuit (32).

5 Claims, 3 Drawing Sheets

DEVICE FOR MEASURING THE ROLL RATE OR ROLL ATTITUDE OF A MISSILE

The invention relates to a device for measuring the roll rate or roll attitude of a missile which rotates about its roll axis, comprising
(a) an attitude gyro arranged in a seeker head of the missile and
(b) means for stimulating the attitude gyro to nutate with its natural nutation frequency in inertial space, From U.S. Pat. No. 4,277,039 it is known to stimulate the attitude gyro of the seeker head to nutate movements having a definite aperture angle in order to scan a field of view by a determined scanning movement.

It is necessary to determine the roll attitude or the roll velocity, respectively, in missiles which rotate about their roll axis. Only in that case an image of the field of view provided by a seeker can be evaluated in a reference system which is stationary relative to the inertial space. Only then correct application of the information of the seeker head to the controls of the missile is ensured. It is known to achieve this information by using a special roll gyro or by roll rate sensors (rate gyros). This, however, requires at least one additional sensor and thus increased expenditure.

It is the object of the invention to determine the roll rate of a rotating missile having a seeker head only from the signals of the seeker head.

According to the invention this object is achieved by
(c) means for detecting the rotational frequency of the attitude gyro relative to the missile,
(d) means for detecting the nutation frequency of the attitude gyro relative to the missile, and
(e) means for generating a signal representing the roll rate or roll attitude of the missile by subtraction of the rotational frequency and nutation frequency obtained by said means, multiplied by factors depending on the gyro.

Thereby the fact is used, that in a attitude gyro a proportional interrelation exists between the inertial nutation frequency $f_N{}^i$, i.e. the nutation frequency measured relative to inertial space, and the inertial rotational frequency $f_K{}^i$. When A designates the moment of inertia about the rotational axis of the attitude gyro and B designates the moment of inertia about an axis perpendicular to the rotational axis, then $$f_N{}^i = \frac{A}{B} f_K{}^i \tag{1}$$

When the nutation frequencies and rotational frequencies are measured in a missile which rotates about its roll axis relative inertial space at a frequency f, then holds $$f_N{}^i = f_N + f \tag{2}$$

$$f_K{}^i = f_K + f \tag{3}$$

wherein $f_N$ and $f_K$ are the missile-fixed nutation frequencies and rotational frequencies, respectively. From this follows $$f = \frac{f_N - K f_K}{K - 1}, \tag{4}$$

when $$K = A/B \tag{5}$$

is the ratio of the moments of inertia. Thus the roll velocity of the missile can be determined only from the signals of the seeker head by subtraction of the nutation frequencies and rotational frequencies measured in the missile, each multiplied by a suitable factor depending on the gyro.

Modifications of the invention are subject matter of the sub-claims.

Embodiments of the invention are described hereinbelow in further detail with reference to the accompanying drawings.

Figure 1:
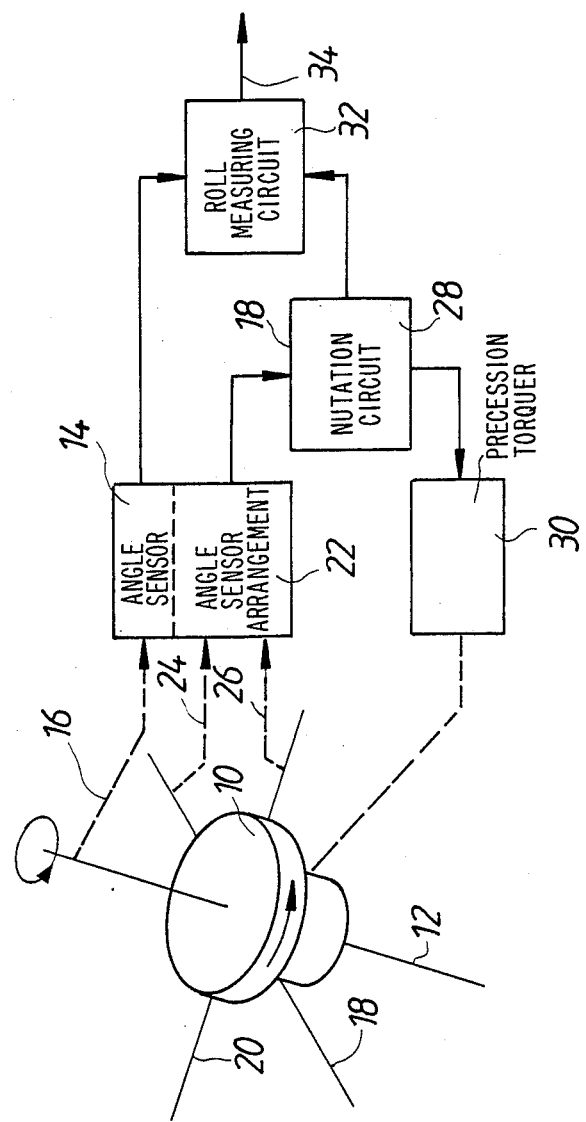
FIG. 1 is a schematic illustration of an attitude gyro with angle sensors, nutation stimulation and roll measuring circuit.

Numeral 10 designates an attitude gyro in a seeker head of a missile. The attitude gyro 10 comprises a gyro rotor which rotates about a spin axis 12. The rotational movement of the gyro rotor about the spin axis 12 is picked off by an angle sensor 14 as indicated by the broken line 16. The attitude gyro 10 is rotatable about a pitch axis 18 and a yaw axis 20 relative to the airframe of the gyro. An angle sensor arrangement 22 is provided which responds to the movement of the attitude gyro 10 about the pitch axis 18 and yaw axis 20, as indicated by the broken lines 24 and 26, respectively. The signals of the angle sensor arrangement 22 are alternating currents with the frequency $f_N$ of the nutation of the attitude gyro 10 observed in the missile-fixed system. They are applied to a circuit 28 which produces signals for stimulating a definite nutation movement of the attitude gyro 10. These signals are applied to a precession torquer 30 which initiates the nutation movement of the attitude gyro 10.

At the same time this arrangement serves for generating a particular movement of the attitude gyro 10 for scanning the field of view. In this respect it corresponds substantially to the arrangement of U.S. Pat. No. 4,277,039.

Now the signal of the angle sensor 14 which represents the rotational frequency $f_K$ of the attitude gyro 10 about its spin axis 12, and a signal with the nutation frequency $f_N$ are additionally applied to the roll measuring circuit 32 which provides e.g. the roll rate at an output 34. The rotational frequency $f_K$, as the measured nutation frequency, is the frequency which is observed in a missile-fixed system.

Figure 2:
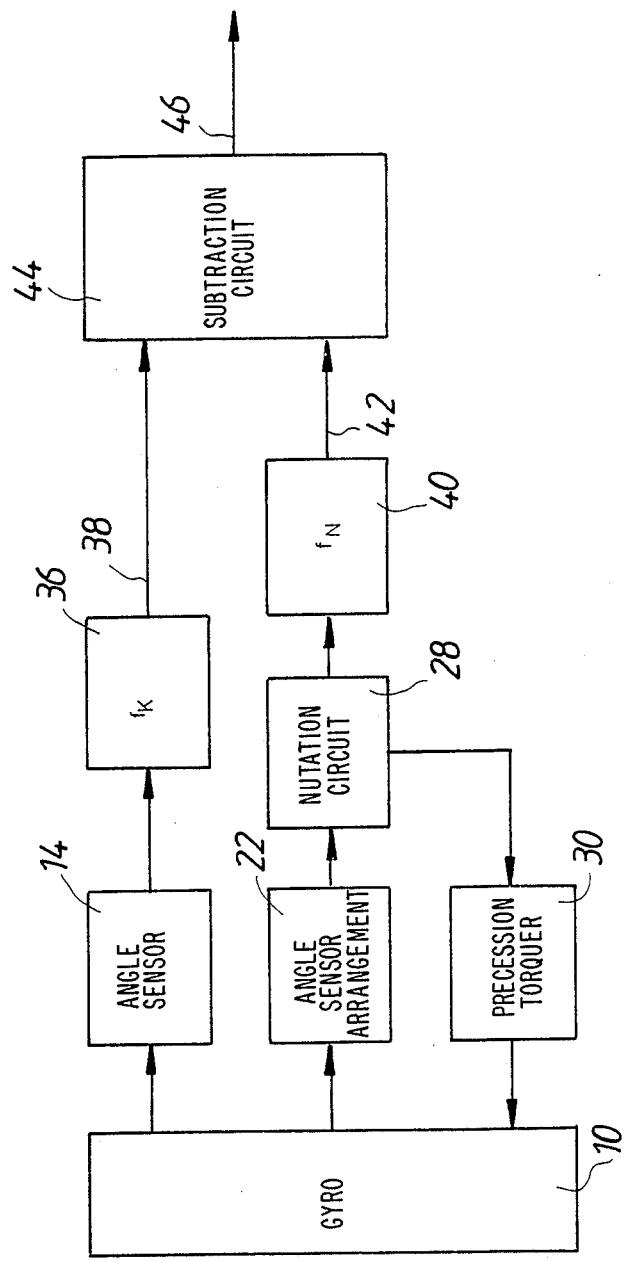
FIG. 2 is a block diagram of the arrangement of FIG. 1 with details of the roll measuring circuit for measuring the roll frequency.

The roll measuring circuit 32 is illustrated in FIG. 2 in a block diagram.

In FIG. 2 numeral 10 designates again the attitude gyro from which a signal having the rotational frequency $f_K$ of the attitude gyro 10 in a missile-fixed system is picked off by an angle sensor 14. A circuit 36 provides an analog signal which represents this rotational frequency $f_K$ at an output 38.

This circuit 36 may be used to control the rotational frequency of the attitude gyro 10 to a predetermined value, such control being known and therefore being not described in further detail.

Numeral 22 designates again the angle sensor arrangement for the movement of the attitude gyro 10 about the pitch axis 18 and yaw axis 20, respectively. The angle sensor arrangement 22 provides signals with the nutation frequency $f_N$. As already explained in context with FIG. 1, these signals are applied to the circuit 28 which in turn controls the precession torquer 30. The circuit 28 provides a signal with the nutation frequency $f_N$ to a circuit 40 for detecting the nutation frequency. The circuit 40 provides an analog signal representing the nutation frequency at an output 42. The signals at the outputs 38 and 42 are applied to a subtraction circuit 44 which forms a linear combination $$f = k_1 f_N - k_2 f_K \tag{6}$$

such that the output signal obtained at an output 46 represents the roll frequency according to equation (4).

Figure 3:
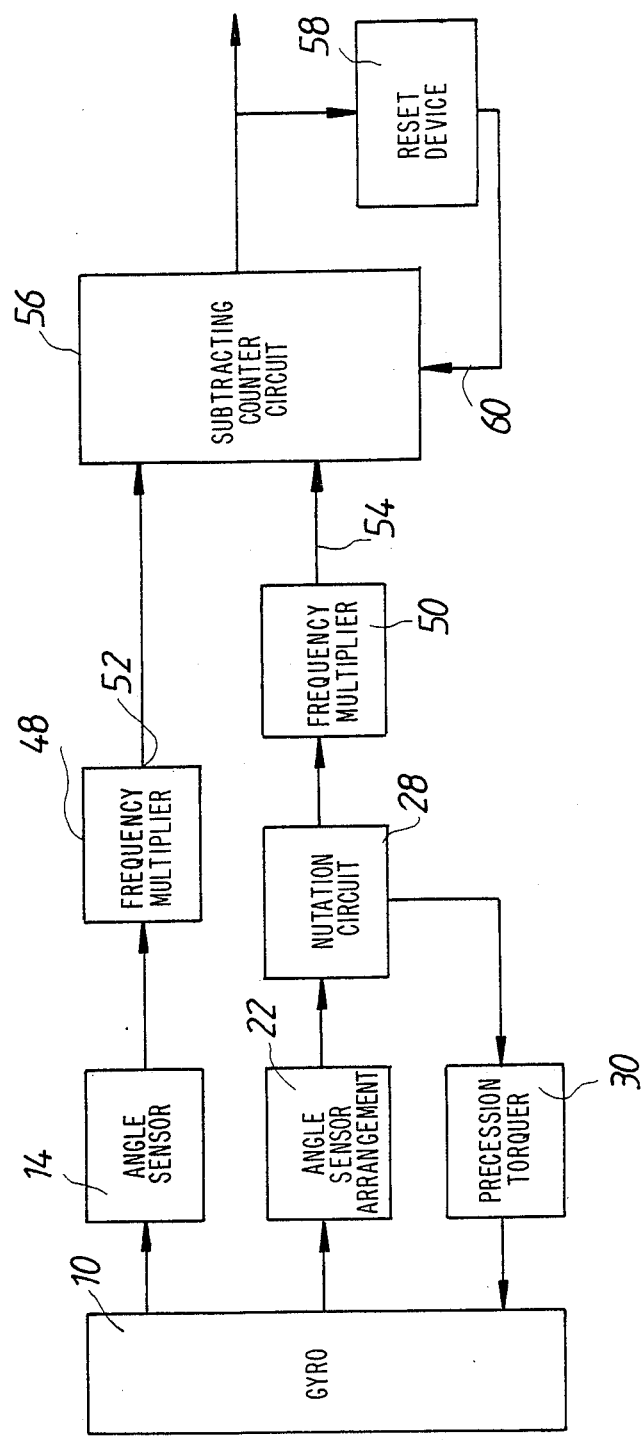
FIG. 3 shows a modification of the arrangement of FIG. 2 for measuring the roll attitude.

FIG. 3 illustrates a modified embodiment which directly provides the roll angle in digital form. Corresponding elements are designated in FIG. 3 by the same reference numerals as in FIG. 2.

In the embodiment of FIG. 3, the signal with the rotational frequency $f_K$ from the angle sensor 14 is applied to a frequency multiplier 48 which increases the frequency $f_K$ by the factor $k_4$. In a corresponding manner the signal with the nutation frequency $f_N$ from the circuit 28 is applied to a frequency multiplier 50 which increases the frequency $f_N$ by the factor $k_5$. The output signal sequence at the outputs 52 and 54 of the frequency multipliers 48 and 50, respectively, are applied to the "count-up" counter input and "count-down" counter input, respectively, of a subtracting counter circuit 56. The factors $k_4$ and $k_5$ are selected such that the output of the counter 56 corresponds to the roll angle. A reset device 58 compares the counter reading to a number $k_6$ which corresponds to a complete revolution of the missile. When the counter reading of counter circuit 56 reaches this value $k_6$ the counter circuit 56 is reset to zero by a reset device 58 through a reset input.

The arrangement of FIG. 3 operates in the following way:

The frequency of the signal sequence at input 52 of the frequency multiplier 48 is $k_4$ times the rotational frequency $f_K$ of the attitude gyro 10. Thus each signal at the output 52 corresponds to a revolution of the gyro rotor about $$\Delta\phi_K = \frac{2\pi}{k}. \tag{7}$$

The frequency of the signal sequence at the output 54 of the frequency multiplier 50 is also $k_5$ times the nutation frequency $f_N$. Thus each signal at the output 54 corresponds to an angle $$\Delta_N = \frac{2\pi}{k_5}. \tag{8}$$

The two signal sequences are supplied to the subtracting counter circuit 56. The counter reading k shall correspond to a complete revolution of the missile about the roll axis. If k is selected $$k_5 = \frac{k_6}{K-1} \tag{9}$$

and $k_4$ is selected $$k_4 = k_5 \cdot K = \frac{k_6 K}{K-1} \tag{10}$$

the change of the counter reading *N during a time interval T becomes:

$$\begin{aligned} N &= k_5 f_N T - k_4 f_K T \\ &= \frac{k_6}{K-1} f_N T - \frac{k_6 K}{K-1} f_K T \\ &= k_6 T \frac{f_N - K f_K}{K-1} \end{aligned} \tag{11}$$

Equating the fraction term according to equation (4) with f, N becomes $$\Delta N = k_6 \cdot f \cdot T \tag{12}$$

For a complete revolution T becomes $$T = 1/f. \tag{13}$$

Then N becomes $$\Delta N = k_6. \tag{14}$$

Thus the change $\Delta N$ is proportional to the roll rate f and the time interval T and thus proportional to the roll angle. The proportionality factor is selected such that a complete revolution of the missile about the roll axis corresponds to a change of the counter reading of $k_6$. The counter 56 is reset each time when the counter reading becomes $k_6$. Thus the counter reading of the counter 56 provides the respective roll angle relative to a particular reference plane as a digital word.

We claim:

1. Device for measuring the roll rate or roll attitude of a missile which rotates about its roll axis, comprising
   (a) an attitude gyro arranged in a seeker head of the missile and
   (b) means for stimulating the attitude gyro to nutate with its natural nutation frequency in inertial space, characterized by
   (c) means for detecting the rotational frequency ($f_K$) of the attitude gyro (10) relative to the missile,
   (d) means for detecting the nutation frequency ($f_N$) of the attitude gyro (10) relative to the missile, and
   (e) means for generating a signal representing the roll rate or roll attitude of the missile by subtraction of the rotational frequency and nutation frequency ($f_K$ and $f_N$, respectively) obtained by said means, multiplied by factors depending on the gyro.

2. Device as set forth in claim 1 characterized in that
   (a) the means for detecting the rotational frequency of the attitude gyro comprise
      an angle sensor (14) responding to the rotation of the gyro rotor about the spin axis (12) and
      a circuit (36), to which the signals of the angle sensor (14) are applied and which provides an analog signal representing the rotational frequency ($f_K$),
   (b) the means for detecting the nutation frequency ($f_N$) comprise
      an angle sensor arrangement (22) which responds to rotations of the attitude gyro (10) about a pitch axis and/or yaw axis (18 and 20, respectively) and provides signals with the nutation frequency ($f_N$) of the position gyro (10), and a circuit (40) to which signals with the nutation frequency ($f_N$) of the angle sensor arrangement are applied from the angle sensor arrangement (22) and which provides an analog signal which represents the nutation frequency, (c) the two analog signals representing the rotational frequency ($f_K$) and the nutation frequency ($f_N$) are applied to a subtracting circuit (44) which forms a linear combination of these signals such that an output signal corresponding to the roll frequency is provided.

3. Device as set forth in claim 2, characterized in that the subtraction circuit (44) forms the linear combination $$k_1 f_N - k_2 f_K$$

wherein $k_1$ is proportional to $1/K$ and $k_2$ is proportional to $K/K-1$ and

K is the ratio of the moments of inertia of the gyro rotor about its spin axis (12) and about an axis perpendicular to the spin axis.

4. Device as set forth in claim 1, characterized in that (a) the means for detecting the rotational frequency of the attitude gyro (10) comprise an angle sensor which responds to the rotation of the gyro rotor about the spin axis (12), (b) a first frequency multiplier (48) is provided which cooperates with the angle sensor (14) and provides an output signal having a frequency which is equal to the rotational frequency ($f_K$) of the attitude gyro (10) multiplied by a first factor ($k_4$), (c) the means for detecting the nutation frequency comprise an angle sensor arrangement (22) which responds to rotation of the attitude gyro (10) about a pitch axis and/or yaw axis (18 and 20, respectively) and provides signals with the nutation frequency ($f_N$) of the position gyro (10), (d) a second frequency multiplier (50) is provided which cooperates with the angle sensor arrangement (22) and provides an output signal having a frequency which is equal to the nutation frequency ($f_N$) of the attitude gyro (10) multiplied by a first factor ($k_5$), (e) one of the signal sequence each, provided by the frequency multipliers (48, 50) is applied to the "count-up" counter input and the "count-down" counter input, respectively, of a subtracting counter circuit, and (f) the counter circuit (56) is arranged to be reset at a predetermined counter reading, (g) wherein the factors ($k_4$, $k_5$) are selected such that the counter reading becomes proportional to the roll angle, and said predetermined counter reading corresponds to a complete revolution of the missile about its roll axis.

5. Device as set forth in claim 4, characterized in that (a) the second factor ($k_5$) is equal to said predetermined counter reading ($k_6$) divided by the ratio subtracted by one ($K-1$) of the moments of inertia of the gyro rotor about its spin axis and an axis perpendicular to the spin axis, and (b) the first factor ($k_4$) is equal to the second factor ($k_5$) multiplied by said said ratio (K).

* * * * *